July 10, 1951 J. L. HAMBLIN 2,560,221
SNOW AND ICE MELTING DEVICE FOR VEHICLES
Filed Aug. 19, 1948 2 Sheets-Sheet 1
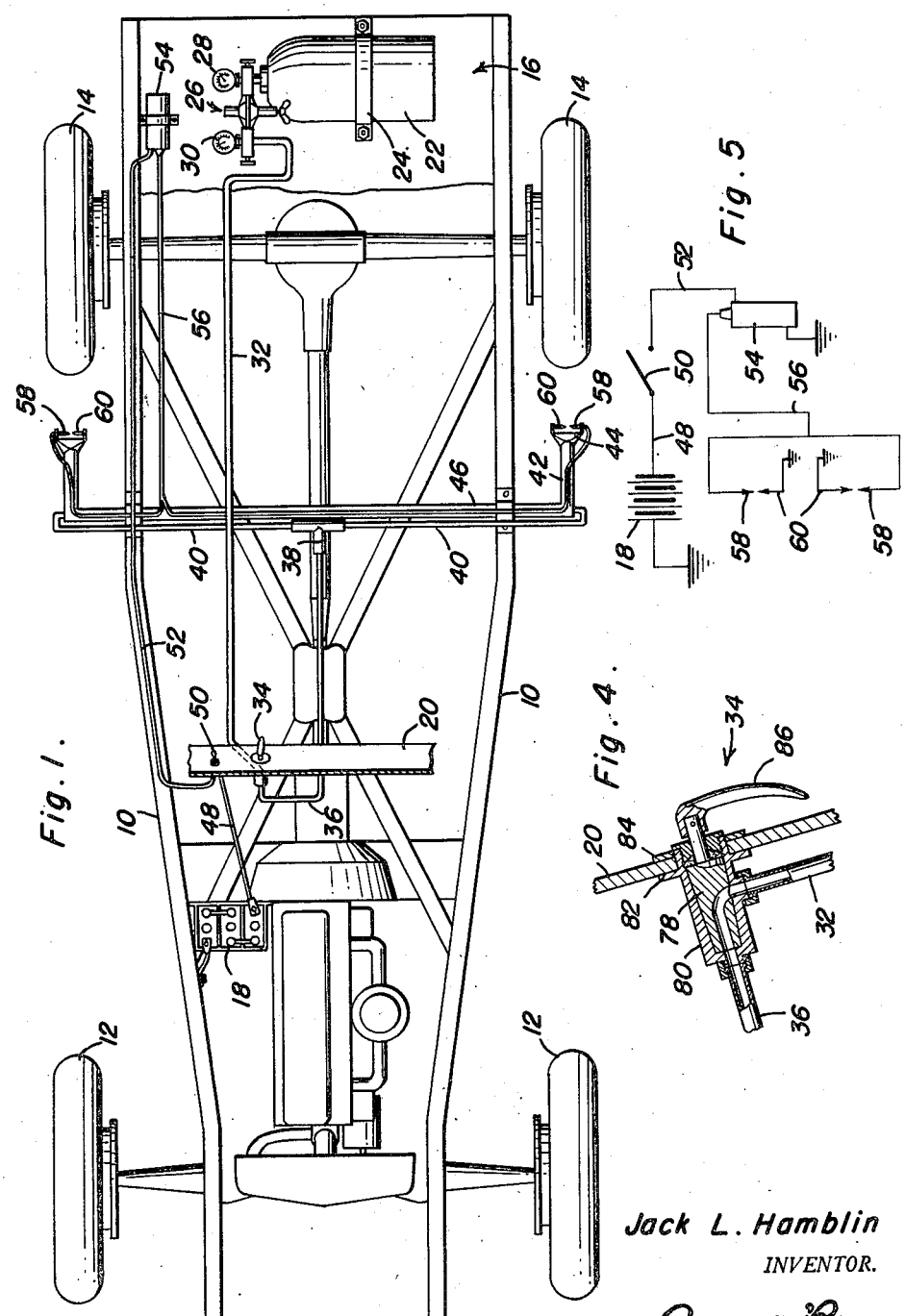
Jack L. Hamblin
INVENTOR.

July 10, 1951  J. L. HAMBLIN  2,560,221
SNOW AND ICE MELTING DEVICE FOR VEHICLES
Filed Aug. 19, 1948  2 Sheets-Sheet 2
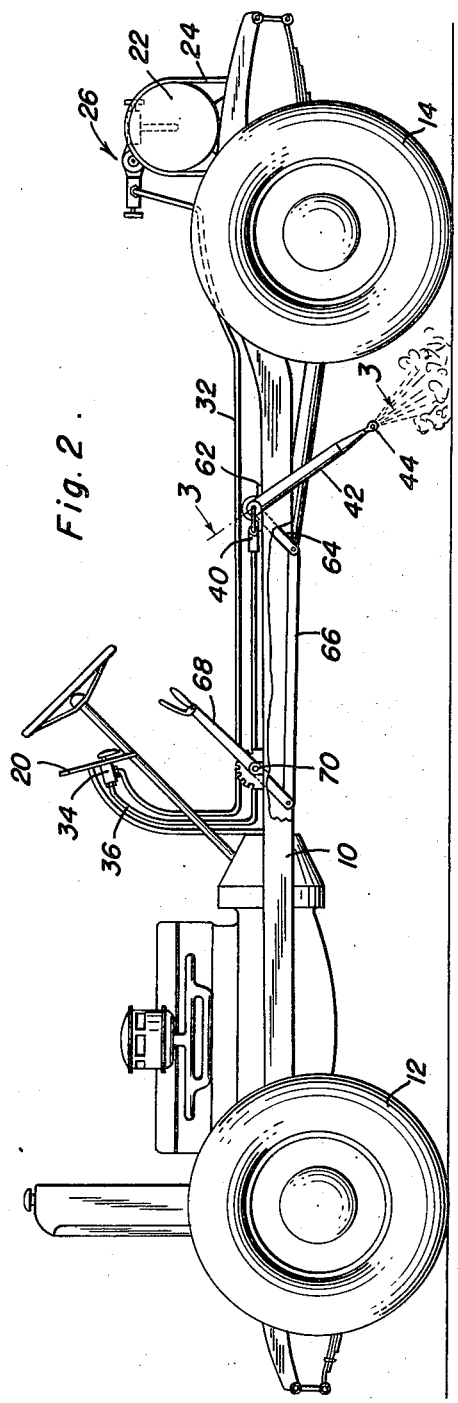
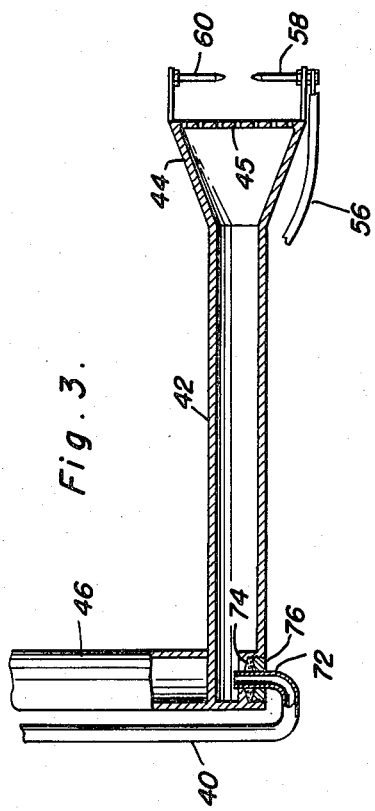
Jack L. Hamblin
INVENTOR.

Patented July 10, 1951

2,560,221

UNITED STATES PATENT OFFICE 2,560,221

SNOW AND ICE MELTING DEVICE FOR VEHICLES

Jack L. Hamblin, Portsmouth, Ohio, assignor of one-half to James C. Walbright, Portsmouth, Ohio Application August 19, 1948, Serial No. 45,097

1 Claim. (Cl. 126—271.2)

This invention relates generally to automotive vehicles and more particularly to a means for melting snow and ice in front of the wheels of an automotive vehicle in order that the traction of these wheels may be improved.

A primary object of this invention is to provide means for melting snow and ice on a roadway whereby a path of limited width may be cleared in front of the traction wheels of an automotive vehicle as the vehicle is propelled forwardly, so that the vehicle may be operated in emergencies even when the roadbed to be traversed is covered with snow and/or ice.

Another object of this invention is to provide means such as is mentioned above in which accurate and convenient control for burners used in the device are provided, these controls being such as to allow variation in the positioning of burners used in the device, as well as the volume of fuel to be used by these burners.

Another object of this invention is to provide a device of the character mentioned above in which the different elements are located conveniently in an automotive vehicle, so that the same may be out of the way during the ordinary operation of the vehicle, while being positioned for ready use in emergencies.

And a last object to be mentioned specifically is to provide a device of the character mentioned above which is relatively inexpensive and practicable to manufacture, which can be applied to many different types of automotive vehicles, which is safe and economical to install and operate, and which will give generally efficient and durable service.

With these objects definitely in view, this invention resides in certain novel features of construction, combination and arrangement of elements and portions as will be hereinafter described in detail in the specification, particularly pointed out in the appended claim, and illustrated in the accompanying drawings which form a material part of this application, and in which:

Figure 1 is a plan view of the chassis of a vehicle with this invention operatively applied thereon, the means for adjusting the burners being deleted from this figure;

Figure 2 is a side elevational view of the same structure as shown in Figure 1;

Figure 3 is an enlarged fragmentary horizontal sectional view of a burner, an arm carrying the burner, a rotatable bar upon which the said arm is mounted and contiguous structure, a portion of the figure being shown in plan, and the igniting means for the fluid fuel, also shown in plan;

Figure 4 is an enlarged vertical sectional view of the valve on the instrument board of the vehicle; and Figure 5 is a diagrammatic view of the electrical connections used in this invention.

Similar characters of reference designate similar or identical elements and portions throughout the specification and throughout the several views of the drawings.

Referring now to the drawings in detail, this invention is adapted to be used with an environment including an automotive vehicle having longitudinal frame members 10 which may be of inverted U-shape as indicated in Figure 2, front and rear wheels 12 and 14, a trunk compartment indicated generally by the numeral 16, a battery 18 and an instrument board 20.

A cylinder 22 containing the fluid fuel will be mounted preferably in the trunk compartment 16, a hold-down strap 24 being indicated as a means for mounting the said cylinder 22 in this trunk compartment. Valve means indicated generally at 26, of the type used to control the flow of fluid from pressurized containers, will be secured to the cylinder 22 and a pair of gages 28 and 30 may be secured at either end of the valve assembly 26 to indicate the pressure of the fluid in the cylinder 22 and in the feed line 32.

The feed line 32 leads to a manually operable valve 34 mounted upon the instrument board 20 and another line 36 leads to a T-connection 38 and to branch pipes 40 leading to the arms 42 which may be hollow tubes, as best indicated in Figure 3, carrying and communicating with the burners 44 which are adapted to spread fluid from the cylinder 22 throughout a very limited area in front of each of the rear wheels 14 of the vehicle, an apertured burner plate 45 being provided in each burner.

A bar 46 is mounted upon the longitudinal frame members 10 of the chassis and the arms 42 are carried by this transversely disposed bar 46.

The means to ignite the fluid emerging from the burners 44 includes an electrical lead 48 connecting the battery 18 with a switch 50 on the instrument board 20. A further electrical lead 52 extends from the switch 50 to an induction coil 54 which may be mounted in the trunk compartment 16 of the vehicle and which is connected with branched leads 56 connected to insulated spark gap points 58 mounted upon each side of each burner 44. Grounded spark gap points 60 will also be provided on each burner, and it will be clear that when the switch 50 is closed and the induction coil 54 is properly adjusted sparks will ignite the fuel emerging from the burners 44.

As best illustrated in Figure 2, means is provided for adjusting the burners positionally with reference to the rear wheels 14 and this means includes bearings 62 whereby the bar 46 is rotatably mounted on the frame members 10. A lever 64 connected by a link 66 with another lever 68 provides for manual adjustment of the bar 46, and the burners carried by the arms 42 which are rigidly supported on said bar 46. The lever 68 will preferably be located in the cab portion of the vehicle adjacent to the driver's seat thereof and may be pivoted, as at 70, on one of the frame members 10. As indicated in Figure 3, it will also be necessary to mount the branch pipes 40 on the arms 42 so as to allow rotation of the latter. A gas-tight connection is provided by returning the ends of the branch pipes 40 inwardly as indicated at 72, and providing a gland packing 74 and a gland packing nut 76 suitably threaded on the pivoted end of each of the arms 42.

The valve 34, as indicated best in Figure 4, will include a valve body 78 rotatably mounted within a valve casing 80 having a flange 82 adapted to abut the instrument board 20. The valve will also include a locking nut 84 and the valve body will be turned by a hand lever 86.

The operation of this invention will be clearly understood from a consideration of the foregoing description of the mechanical details thereof, taken in connection with the drawings and with the above recitation of the objects. Further description is therefore deemed unnecessary. Many minor variations from the embodiment illustrated may be resorted to, all within the spirit of this invention and the scope of this invention should be limited only as determined by a proper interpretation of the subjoined claim.

Having described the invention, what is claimed as new is:

In an automotive vehicle, traction wheels for the vehicle, a supply of pressurized inflammable fluid, flame spreading burners, means securable to said vehicle to mount said burners on said vehicle in front of said wheels for pivotal adjustment in vertical planes in front of the wheels of the vehicle, means to ignite said fluid at said burners, means to control the flow of said fluid to said burners, said means to mount said burners comprising a rotatably mounted bar having arms extending from the ends thereof, said burners being mounted on the free ends of said arms and said arms comprising pipes conducting fuel to said burners, lever means to rock said bar so that said burners are vertically adjusted to the desired position, branch pipes disposed parallel and adjacent to said bar, end portions of said branch pipes returned for pivotal and gas-conductive connection with said arms, and a supply pipe connecting said branch pipes with said supply.

JACK L. HAMBLIN.

REFERENCES CITED

The following references are of record in the file of this patent:

UNITED STATES PATENTS

| Number | Name | Date |
| --- | --- | --- |
| 77,602 | Floyd | May 5, 1868 |
| 851,011 | Lamb | Apr. 23, 1907 |
| 1,215,620 | Carrillo | Feb. 13, 1917 |
| 1,398,454 | Daniels | Nov. 29, 1921 |
| 1,502,104 | Lieber | July 22, 1924 |
| 1,517,949 | Bugg | Dec. 2, 1924 |
| 1,629,160 | Heermance | May 17, 1927 |
| 1,921,901 | Anderson | Aug. 8, 1933 |
| 1,987,603 | Claesson | Jan. 15, 1935 |
| 2,369,154 | McLemore | Feb. 13, 1945 |
| 2,487,353 | McLemore | Nov. 8, 1949 |